United States Patent
Jefferson et al.

(10) Patent No.: US 11,413,570 B2
(45) Date of Patent: Aug. 16, 2022

(54) ROTARY BED SORPTION SYSTEM INCLUDING RECYCLED ISOLATION LOOP AND PURGE/REGENERATION LOOP

(71) Applicant: Munters Corporation, Selma, TX (US)

(72) Inventors: Douglas S. Jefferson, Salem, MA (US); Stephen C. Brickley, Amesbury, MA (US)

(73) Assignee: Munters Corporation, Selma, TX (US)

( * ) Notice: Subject to any disclaimer, the term of this patent is extended or adjusted under 35 U.S.C. 154(b) by 403 days.

(21) Appl. No.: 16/459,228

(22) Filed: Jul. 1, 2019

(65) Prior Publication Data
US 2020/0001226 A1 Jan. 2, 2020

Related U.S. Application Data

(60) Provisional application No. 62/691,919, filed on Jun. 29, 2018.

(51) Int. Cl.
| | | |
|---|---|---|
| *B01D 53/02* | (2006.01) | |
| *B01D 53/06* | (2006.01) | |
| *B01D 53/26* | (2006.01) | |

(52) U.S. Cl.
CPC .......... *B01D 53/06* (2013.01); *B01D 53/261* (2013.01); *B01D 2257/404* (2013.01); *B01D 2257/708* (2013.01); *B01D 2257/80* (2013.01); *B01D 2259/4009* (2013.01)

(58) Field of Classification Search
CPC ........ B01D 2257/404; B01D 2257/708; B01D 2257/80; B01D 2258/06; B01D 2259/4009; B01D 53/002; B01D 53/06; B01D 53/261; B01D 53/265
See application file for complete search history.

(56) References Cited

U.S. PATENT DOCUMENTS

| | | | |
|---|---|---|---|
| 4,701,189 A | 10/1987 | Oliker | |
| 4,775,484 A | 10/1988 | Schmidt et al. | |
| 5,802,870 A | * 9/1998 | Arnold | .................. F25B 49/046 62/480 |
| 6,328,787 B1 | 12/2001 | Yamauchi | |
| 7,101,414 B2 | 9/2006 | Dinnage et al. | |

(Continued)

FOREIGN PATENT DOCUMENTS

WO 2012/109550 A1 8/2012

OTHER PUBLICATIONS

International Search Report and Written Opinion dated Sep. 30, 2019, in International Application No. PCT/US19/40164.

(Continued)

*Primary Examiner* — Christopher P Jones
(74) *Attorney, Agent, or Firm* — Venable LLP (57) ABSTRACT

A rotary sorption bed system includes a rotating sorbent mass of a regenerable sorbent material, in a cycle of operation, a given volume of the sorbent mass sequentially passing through first, second, third, fourth, and fifth zones, before returning to the first zone; a process fluid stream directed through the first zone; a regeneration fluid stream directed through the third zone; and an isolation fluid stream that recirculates in a closed loop independent of the process fluid stream and the regeneration fluid stream through the second and fourth zones. The regeneration fluid stream passes through the fifth zone before passing through the third zone.

13 Claims, 8 Drawing Sheets

(56) References Cited

U.S. PATENT DOCUMENTS

| | | | |
|---|---|---|---|
| 8,628,608 B2 | 1/2014 | Jensen et al. | |
| 2005/0235827 A1* | 10/2005 | Dinnage | B01D 53/06 95/113 |
| 2009/0139254 A1* | 6/2009 | Landry | B01D 5/0033 62/271 |
| 2010/0275775 A1 | 11/2010 | Griffiths et al. | |
| 2012/0152116 A1* | 6/2012 | Barclay | C07C 7/12 95/113 |
| 2012/0204718 A1* | 8/2012 | Dinnage | B01D 53/1475 95/91 |

OTHER PUBLICATIONS

Written Opinion dated Mar. 8, 2022, in Singaporean Application No. 11202012846W.

* cited by examiner

| ALTITUDE | 0 | FT |
|---|---|---|
| BARO PRESS | 29.921 | IN HG |

| INITIALIZATION VALUES FOR OPTIMIZATION | | |
|---|---|---|
| TARGET REACT OUTLET TEMP.= | 165 | DEG. F |
| GUESS REACT VOLUME | 279 | SCFM |

[ CALC PE PERFORMANCE ]

[ 1500 ROTOR ▼ ] [ HPXPP ▼ ]

| | | | 1 | 2 | 3 | 4 | 5 | 6 | 7 | 8 |
|---|---|---|---|---|---|---|---|---|---|---|
| V | FLOW RATE | SCFM | 279 | 6000 | 6000 | 157.7 | 157.7 | 279 | 279 | 279 |
| P | PRESSURE | IN HG | 29.92 | 29.92 | 29.92 | 29.92 | 29.92 | 29.92 | 29.92 | 29.92 |
| T | TEMPERATURE | DEG F | 45.0 | 45.0 | 48.5 | 41.9 | 321.1 | 125.1 | 325.0 | 165 |
| W | HUMIDITY RATIO | GR/LB | 4.0 | 4.0 | 0.00128 | 3.64 | 0.03 | 0.0036 | 0.0036 | 89.9 |
| DP | DEW POINT | DEG F | -6.03 | -6.03 | -118.622 | -7.77 | -83.34 | -107.37 | -107.37 | 64.1 |

| ANGLES | | | |
|---|---|---|---|
| 290 | PROCESS MANOMETER | IN WC | 0.92 |
| 15 | WARMING PURGE MANOMETER | IN WC | 0.68 |
| 20 | REACTIVATION MANOMETER | IN WC | 1.08 |
| 15 | COOLING PURGE MANOMETER | IN WC | 0.69 |
| 20 | HARD PURGE MANOMETER | IN WC | 0.69 |
| | WHEEL RPH | | 4 |
| | WHEEL DEPTH | MM | 400 |

MOISTURE BALANCE     1.0005
TEMPERATURE BALANCE     0.9747

| | | | 1 | 2 | 3 | 4 | 5 | WP 6 | CP 7 |
|---|---|---|---|---|---|---|---|---|---|
| V | FLOW RATE | SCFM | 9000 | 9000 | 409 | 408.6 | 409 | 233.2 | 233 |
| P | PRESSURE | IN HG | 29.92 | 29.92 | 29.92 | 29.92 | 29.92 | 29.92 | 29.92 |
| T | TEMPERATURE | DEG F | 45.00 | 52.1 | 45.00 | 325.0 | 165.0 | 320.0 | 47.8 |
| W | HUMIDITY RATIO | GR/LB | 4.00 | 0.0089 | 4.00 | 4.00 | 91.9 | 3.26 | 3.17 |
| DP | DEW POINT | DEG F | -6.03 | -96.849 | -6.03 | -6.03 | 64.71 | -9.82 | -10.29 |

ANGLES

| 300 | PROCESS MANOMETER |
| 15 | WARMING PURGE MANOMETER |
| 30 | REACTIVATION MANOMETER |
| 15 | COOLING PURGE MANOMETER |

WHEEL RPH    6
WHEEL DEPTH    MM    400

MOISTURE BALANCE    1.0004
TEMPERATURE BALANCE    0.9941

*FIG. 7*
*(PRIOR ART)*

| ALTITUDE | FT | 0 |
| BARO PRESS | IN HG | 29.921 |

| INITIALIZATION VALUES FOR OPTIMIZATION | | |
|---|---|---|
| TARGET REACT OUTLET TEMP. = | DEG. F | 165 |
| GUESS REACT VOLUME | SCFM | 272 |

CALC PE PERFORMANCE

1500 ROTOR | HPXPP

| | | | 1 | 2 | 3 | 4 | 5 | WP 6 | CP 7 |
|---|---|---|---|---|---|---|---|---|---|
| V | FLOW RATE | SCFM | 6000 | 6000 | 272 | 271.9 | 272 | 156.7 | 157 |
| P | PRESSURE | IN HG | 29.92 | 29.92 | 29.92 | 29.92 | 29.92 | 29.92 | 29.92 |
| T | TEMPERATURE | DEG F | 45.00 | 52.0 | 45.00 | 325.0 | 164.9 | 320.1 | 41.8 |
| W | HUMIDITY RATIO | GR/LB | 4.00 | 0.0081 | 4.00 | 4.00 | 92.1 | 3.46 | 3.51 |
| DP | DEW POINT | DEG F | -6.03 | -98.017 | -6.03 | -6.03 | 64.76 | -8.71 | -8.43 |

| ANGLES | |
|---|---|
| 300 | PROCESS MANOMETER |
| 15 | WARMING PURGE MANOMETER |
| 30 | REACTIVATION MANOMETER |
| 15 | COOLING PURGE MANOMETER |
| | WHEEL RPH — 4. |
| | WHEEL DEPTH — MM — 400 |

MOISTURE BALANCE 1.0006
TEMPERATURE BALANCE 0.9751

*FIG. 8*
*(PRIOR ART)*

ROTARY BED SORPTION SYSTEM INCLUDING RECYCLED ISOLATION LOOP AND PURGE/REGENERATION LOOP

This application claims the benefit of provisional U.S. patent application Ser. No. 62/691,919, filed Jun. 29, 2018, which is incorporated herein by reference.

BACKGROUND OF THE INVENTION

Field of the Invention

The present invention relates generally to a rotary bed sorption system, and, in particular, to a rotary bed sorption system that includes both a recycled isolation loop and a purge/regeneration loop. The invention also relates to methods of designing and operating such a system.

Description of the Related Art

Rotary bed sorption systems have long been used to collect a sorbate from one fluid stream, sometimes called a process or sorption fluid stream, and transfer it, in a more concentrated form, to a second fluid stream, sometimes called a desorption or regeneration fluid stream. Commonly-removed sorbates include water vapor, volatile organic compounds ("VOCs"), nitrous oxides ("NOx"), and the like.

It is important in a rotary bed sorption system, particularly one in which a low sorbate concentration is desired in the treated fluid, to minimize any cross-contamination between the process fluid stream and the regeneration fluid stream. Contamination can result from pressure differences in the fluid streams themselves, or vapor pressure differences within the matrix of the rotating sorbent disk.

Another source of possible contamination lies in areas of the sorbent disk that are adjacent to the active sorptive area, but that do not see active fluid flow during the cycle. Usually these are the areas at the center and outer periphery of the sorbent disk that are covered by sealing systems. Typically, sorbent disks are intentionally designed to have these "dead zones," which act as a thermal insulator, keeping the rotor housing cool and preventing its thermal expansion which could lead to premature mechanical failure of the component. It has been demonstrated that in systems designed to achieve a very low sorbate concentration in the treated fluid stream, these areas can act as "sinks" for the vapor being removed. The sinks accumulate vapor when they are adjacent to the regeneration zone, where they are exposed through diffusive forces to the high concentration of the vapors in the regeneration zone, but are not subject to the heat of the regeneration, due to the high insulating characteristics of the glass/ceramic structure. The sorbent then can come to near equilibrium with the high-concentration vapor, but at a much lower temperature. The sinks release their payload when they are adjacent to the very low-concentration fluid in the process section of the system. The vapor pressure difference overcomes the diffusive force of the structure, and trace amounts of vapor are released into the treated fluid stream, causing detrimental increases in the concentration of the vapor being removed.

It is known to incorporate purge zones in rotary bed sorption systems. An example of a sorption bed system including a recirculating purge loop is disclosed in U.S. Pat. No. 4,701,189. It is also known to use one or more isolation fluid streams or loops in order to reduce cross-contamination between sorption and desorption zone of rotary sorption beds. U.S. Pat. No. 7,101,414 describes several embodiments in which one or more isolation loops are used to achieve different goals. None, however, combines purge and isolation streams in the manner of the present invention.

SUMMARY OF THE INVENTION

The present invention uses a purge/regeneration loop that uses warm air from a zone of a rotor after the regeneration zone to preheat the air to be further heated for supply to the regeneration zone, and a recycled isolation loop that cools the rotor material on the process air inlet side and pre-warms the rotor before it enters the regeneration sector. One or more of the recycled isolation loops can be provided to reduce cross-contamination between sorption and desorption zones of rotor caused by pressure imbalances and large vapor pressure differences of the various fluid streams.

According to one aspect of the present invention, a method of reducing the sorbate concentration of a process fluid stream using a sorption bed system comprising a rotating mass of a regenerable sorbent material comprises the steps of rotating the sorbent mass so that, in a cycle of operation, a given volume of the sorbent mass sequentially passes through first, second, third, fourth, and fifth zones, before returning to the first zone; passing a process fluid stream through the sorbent mass in the first zone; passing a regeneration fluid stream through the sorbent mass in the third zone; and recycling an isolation fluid stream in a closed loop, independent of the process fluid stream and the regeneration fluid stream, between the sorbent mass in the fourth zone and in the second zone, wherein the regeneration fluid stream passes through the fifth zone before passing through the third zone.

According to another aspect of the present invention, a rotary sorption bed system comprises a rotating sorbent mass of a regenerable sorbent material, in a cycle of operation, a given volume of the sorbent mass sequentially passing through first, second, third, fourth, and fifth zones, before returning to the first zone; a process fluid stream directed through the first zone; a regeneration fluid stream directed through the third zone; and an isolation fluid stream that recirculates in a closed loop independent of the process fluid stream and the regeneration fluid stream through the second and fourth zones, wherein the regeneration fluid stream passes through the fifth zone before passing through the third zone.

As used herein, "cycle of operation" means a path of movement of the sorbent mass during which the sorbent mass undergoes both a sorption and desorption process. The term "sequentially" refers to a relative order, but does not necessarily require that one immediately follow another. In this embodiment, for example, even if another zone were interposed between the first zone and the second zone, it would still be accurate to say that the sorbent mass sequentially passes through the first zone, the second zone, and so on.

A better understanding of these and other aspects of the present invention may be had by reference to the drawings and to the accompanying description, in which preferred embodiments of the invention are illustrated and described.

DESCRIPTION OF THE PREFERRED EMBODIMENTS

Figure 1:
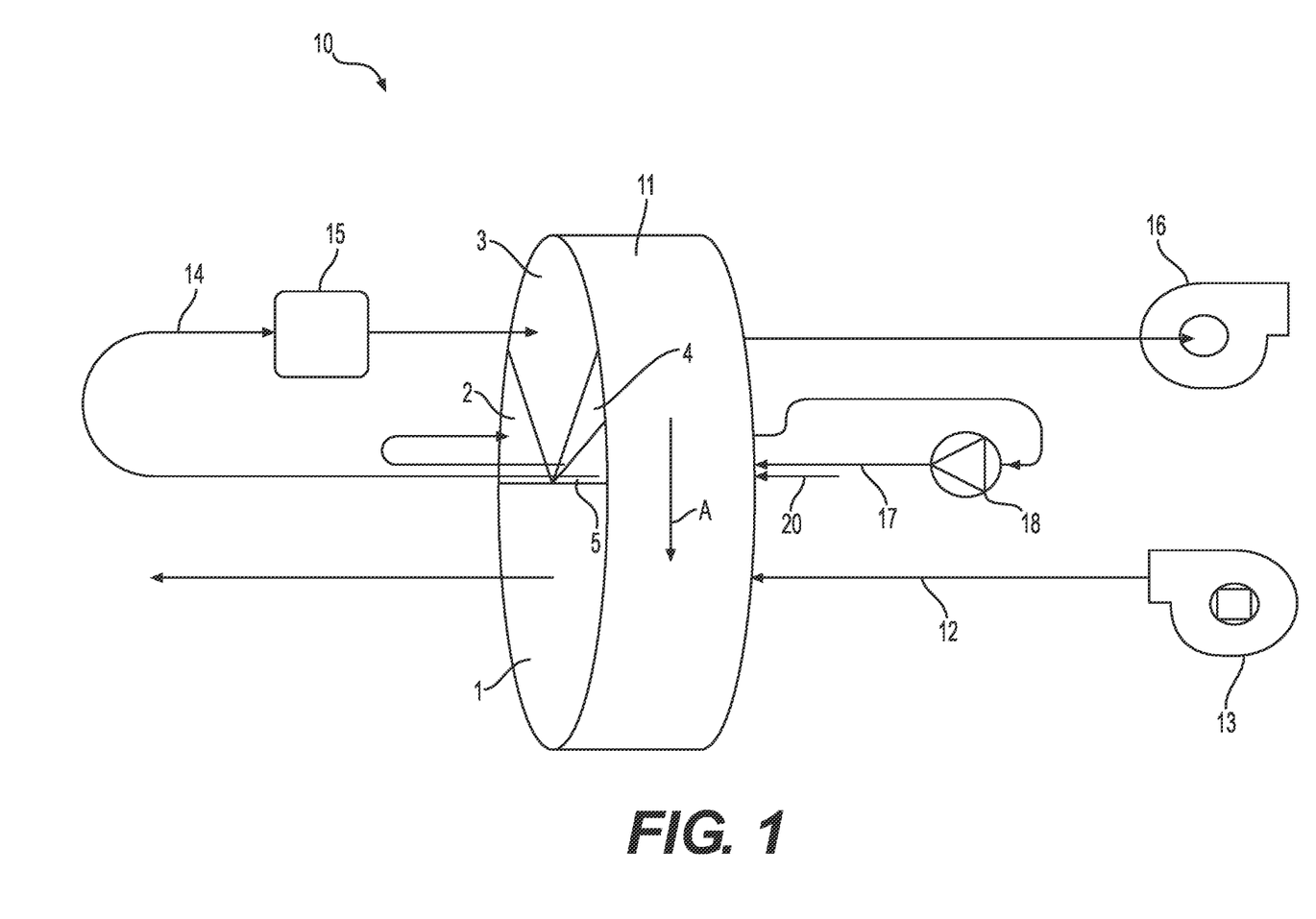
FIG. 1 is a schematic flow diagram illustrating a preferred embodiment of a rotary bed sorption system in accordance with the invention.
Figure 2:
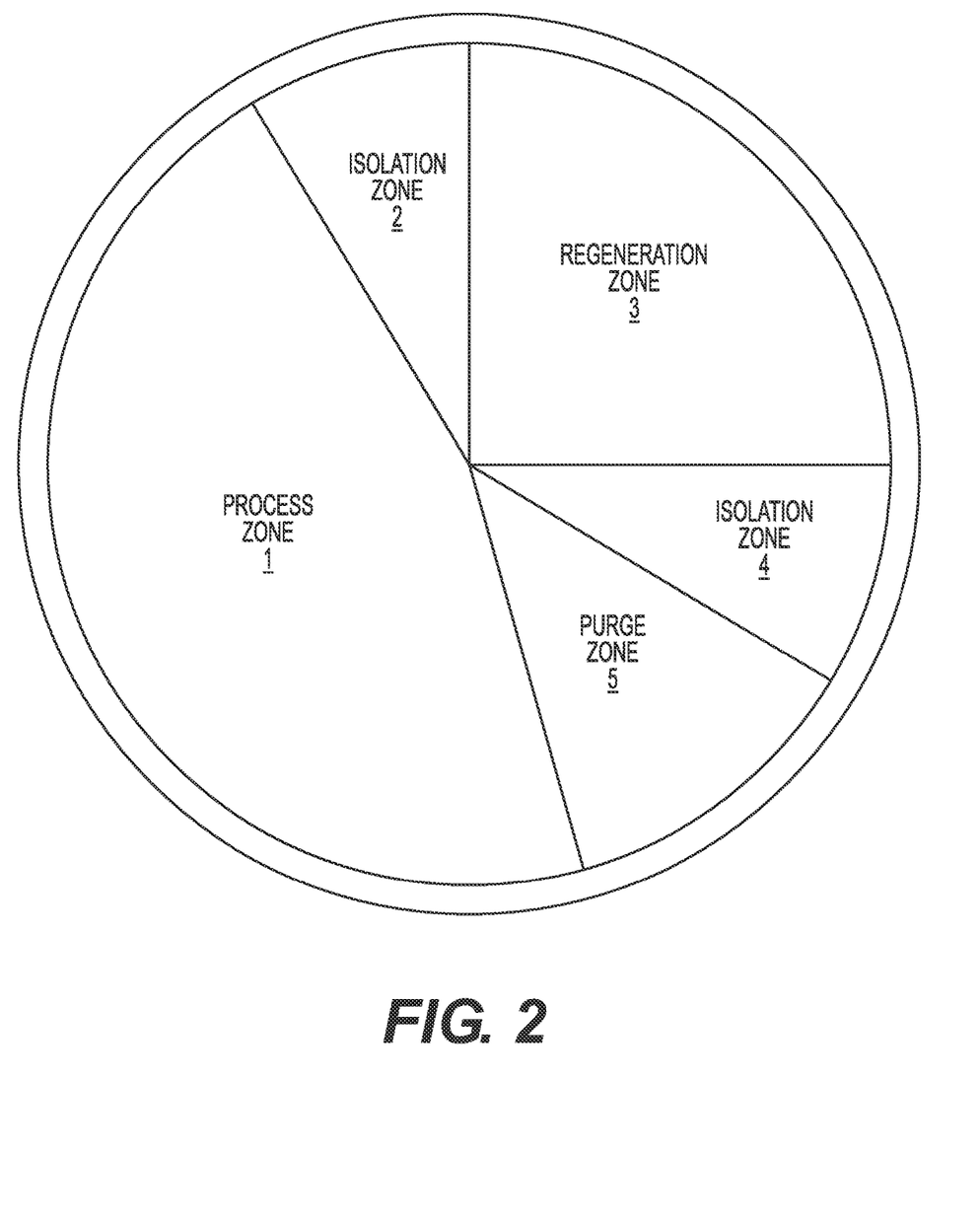
FIG. 2 is a schematic view of the sectors of a sorbent mass in the preferred embodiment of the rotary bed sorption system in accordance with the invention.

FIG. 1 illustrates a preferred embodiment of a rotary sorption bed system 10 in accordance with the present invention. The system includes a rotating disk-shaped porous mass or rotor 11 of a conventional construction containing or coated with regenerable sorbent material that, in a cycle of operation, sequentially passes through five zones, namely, a first zone 1, a second zone 2, a third zone 3, a fourth zone 4, and a fifth zone 5. The sorbent rotor 11 is rotated about its axis in the direction indicated by arrow A by a known rotor mechanism (not shown). The five zones, in order in the direction of rotation of the rotor 11, can be identified as a process zone 1 through which process air flows, a first isolation zone 2 through which recycled isolation air flows to pre-warm the rotor, a regeneration zone 3 through which heated regeneration air flows, a second isolation zone 4 through which the recycled isolation air flows to be warmed, and a regeneration purge zone 5 through which the recycled regeneration air flows to be simultaneously pre-warmed and dried prior to being heated by a separate heater.

A process fluid stream 12 carrying a sorbate (e.g., water vapor) is passed through the sorbent rotor 11 in the first zone 1, where the sorbate is sorbed (i.e., loaded) onto the sorbent rotor 11. The process fluid stream exiting the sorbent mass has a reduced sorbate concentration compared to the process fluid stream entering the sorbent mass. Optionally, a fan, blower, or other fluid-moving device 13 can be used to drive the process fluid flow through duct work (not shown).

A regeneration fluid stream 14 is passed through the sorbent rotor 11 in the third zone 3, in a direction opposite to the flow of the process fluid stream 12. The sorbent from the process fluid stream that was collected in the sorbent mass 11 is released into the regeneration fluid stream. A heater 15 can be provided to heat the regeneration fluid stream 14 prior to its passing through the sorbent mass 11. As with the process fluid stream, a fan, blower, or other fluid-moving device 16 can be used to drive the regeneration fluid flow.

Although the process fluid stream 12 is not shown in FIG. 1 as being a closed loop circuit, those skilled in the art will appreciate that that fluid stream can be recirculated in a closed loop. For example, upon exiting the sorbent mass, the regeneration fluid stream can be cooled to condense vapor out of the fluid stream and then be reheated before being routed back through the sorbent mass.

An isolation fluid stream 17 is recycled in a closed loop, independent of the process fluid stream 12 and the regeneration fluid stream 14, between the sorbent mass 11 in the second zone 2 and in the fourth zone 4. A purge/regeneration fluid stream 20 flows through the fifth zone disposed immediately after the fourth zone. The purge/regeneration fluid stream becomes the supply of the regeneration fluid stream 14 and can be driven by fluid-moving device 16. Preferably, the direction that the isolation fluid stream 17 flows through the sorbent mass 11 is the same direction as the fluid flowing through the zone immediately following the isolation zone in the direction of rotation of the sorbent mass 11. In FIG. 1, for example, the isolation fluid stream 17 passes through the second zone 2 in the same direction that regeneration fluid stream 14 flows through the third zone 3, and passes through the fourth zone 4 in the same direction that the purge/regeneration fluid stream 20 flows through the fifth zone 5. Alternatively, the direction that the isolation fluid stream flows through the sorbent mass could be opposite from the direction of fluid flow through the zone immediately following the isolation zone in the direction of rotation of the sorbent mass. A fan, blower, or other fluid-moving device 18 can optionally be provided to drive the isolation fluid flow. Providing the recycled isolation loop helps to reduce cross-contamination between the process fluid stream 12 and the regeneration fluid stream 14. Separate fans 16, 18 are used for the purge/regeneration loop and recycled isolation loop, as well as for the process air stream (13).

Figure 3:
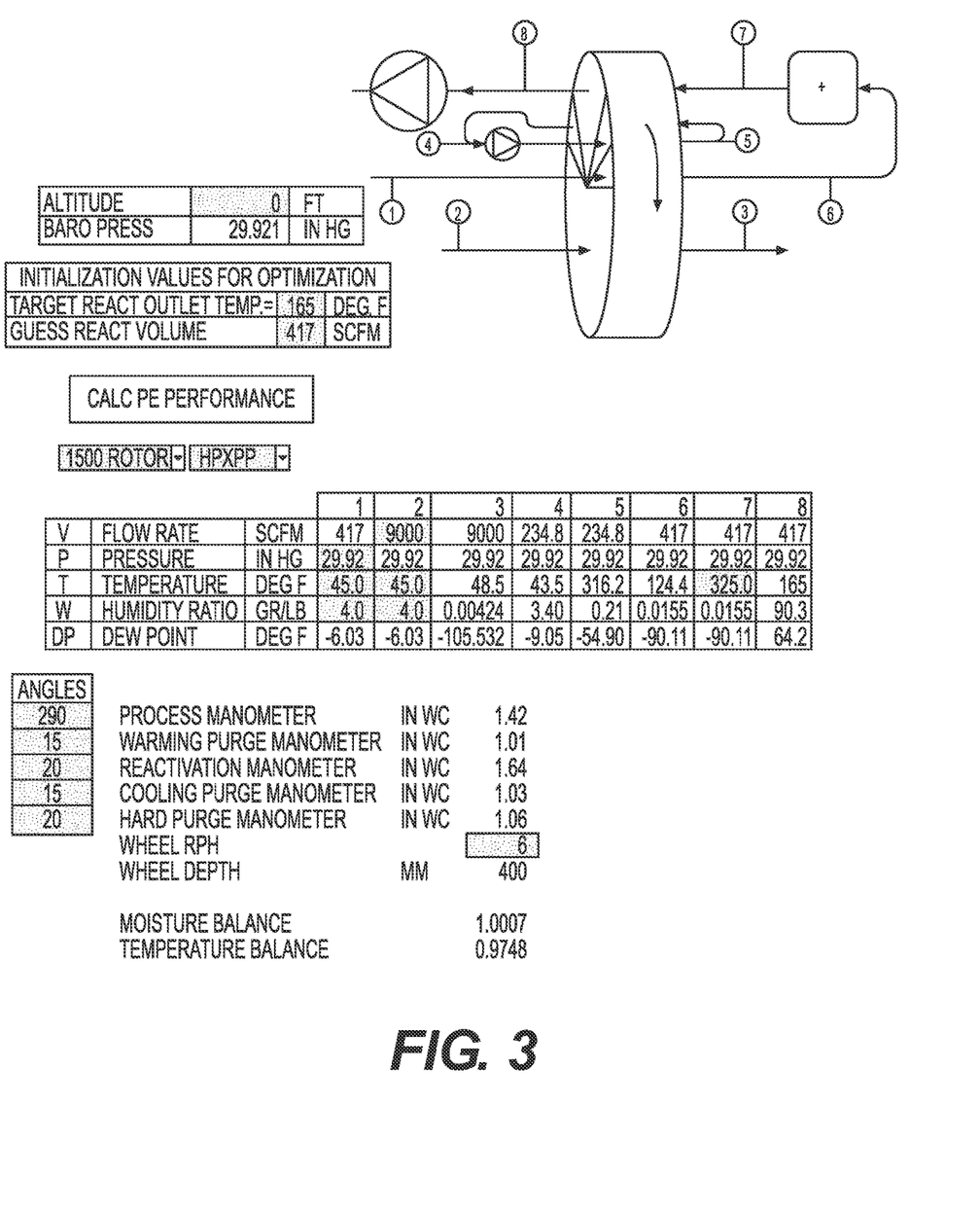
FIG. 3 shows operation data at various locations in the preferred embodiment of the rotary bed sorption system in accordance with the invention at a first flow rate.
Figure 4:
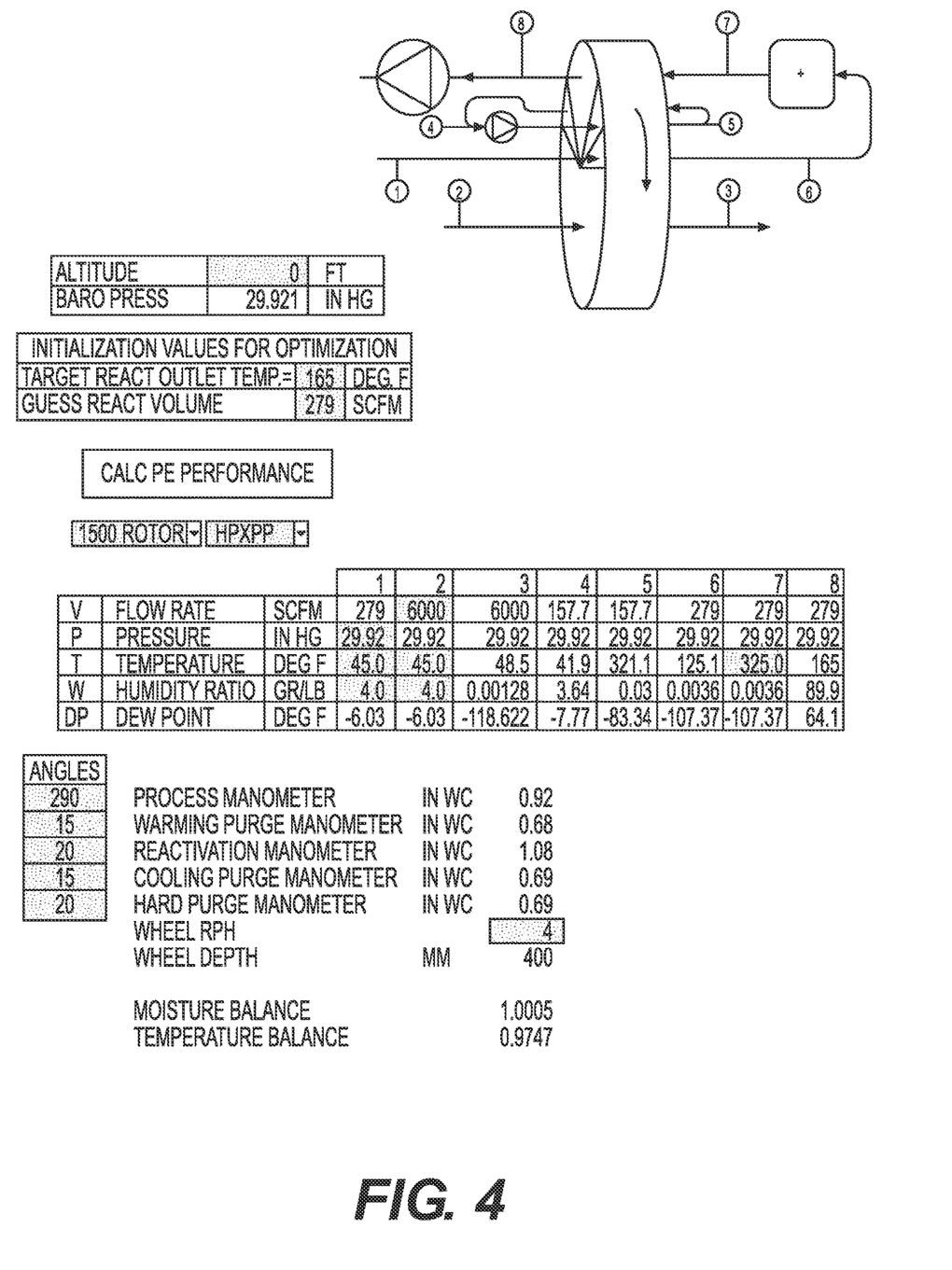
FIG. 4 shows operation data at various locations in the preferred embodiment of the rotary bed sorption system in accordance with the invention at a second flow rate.
Figure 5:
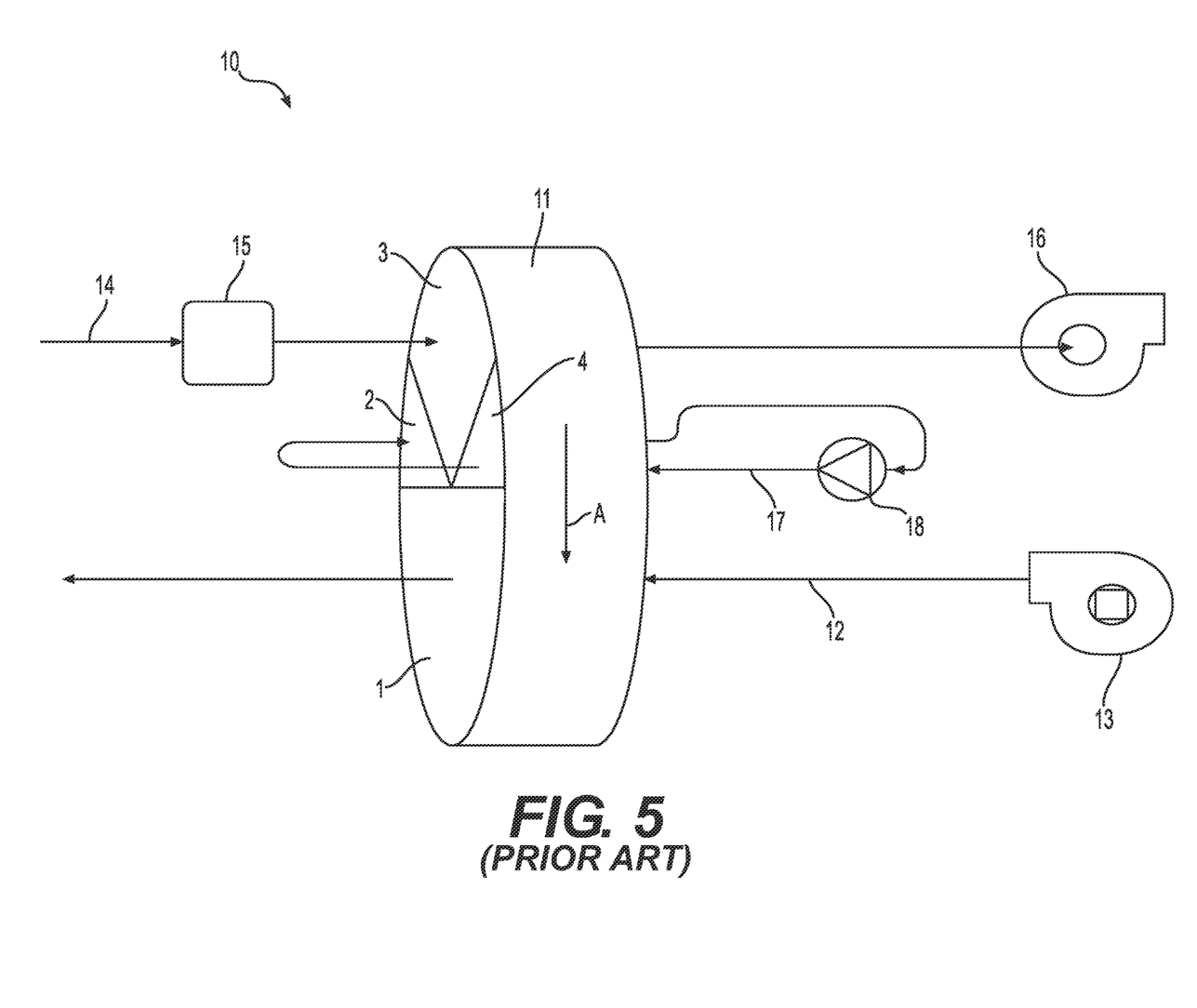
FIG. 5 is a schematic illustration of a four-zone rotary bed sorption system.
Figure 6:
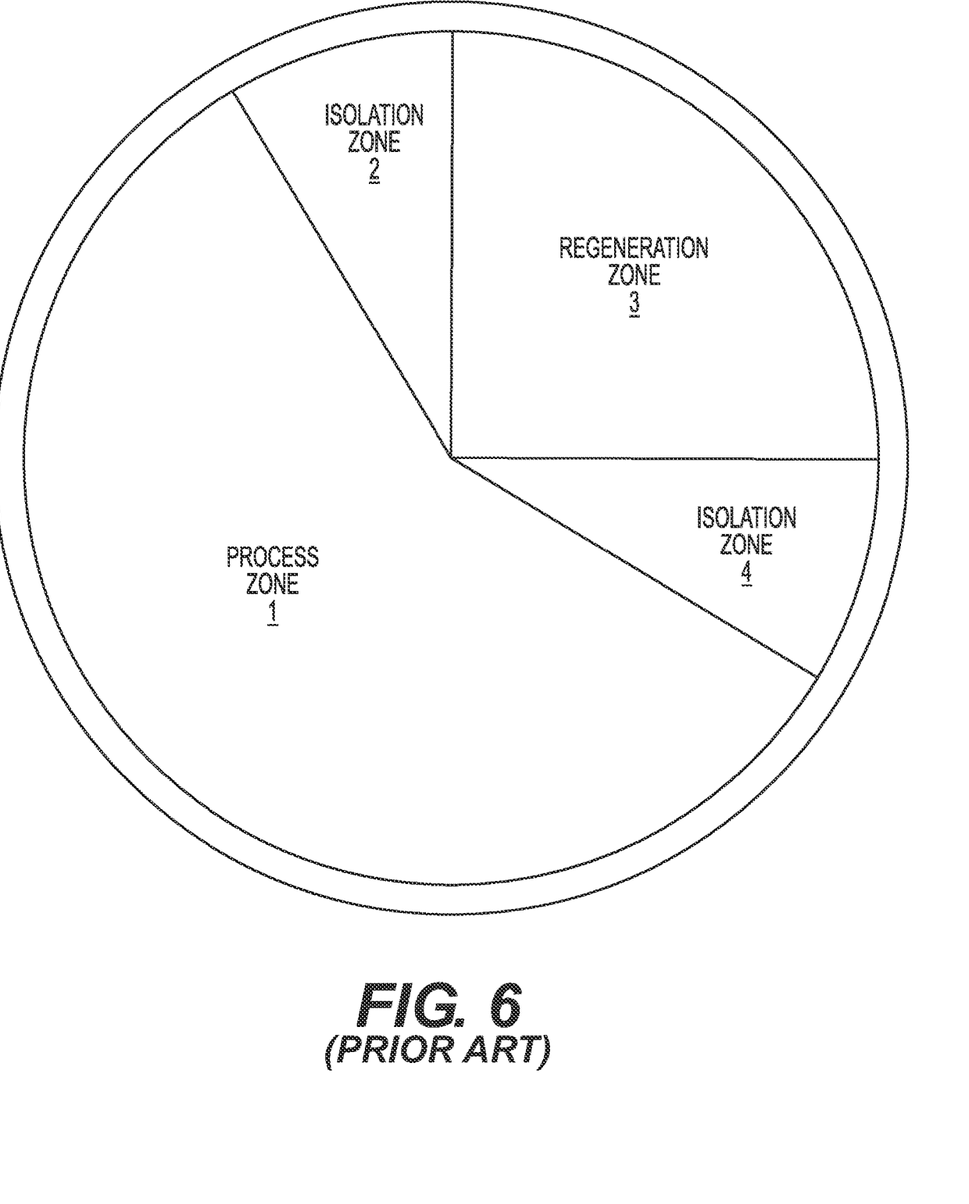
FIG. 6 is a schematic view of the sectors of a sorbent mass in the four-zone rotary bed sorption system.
Figure 7:
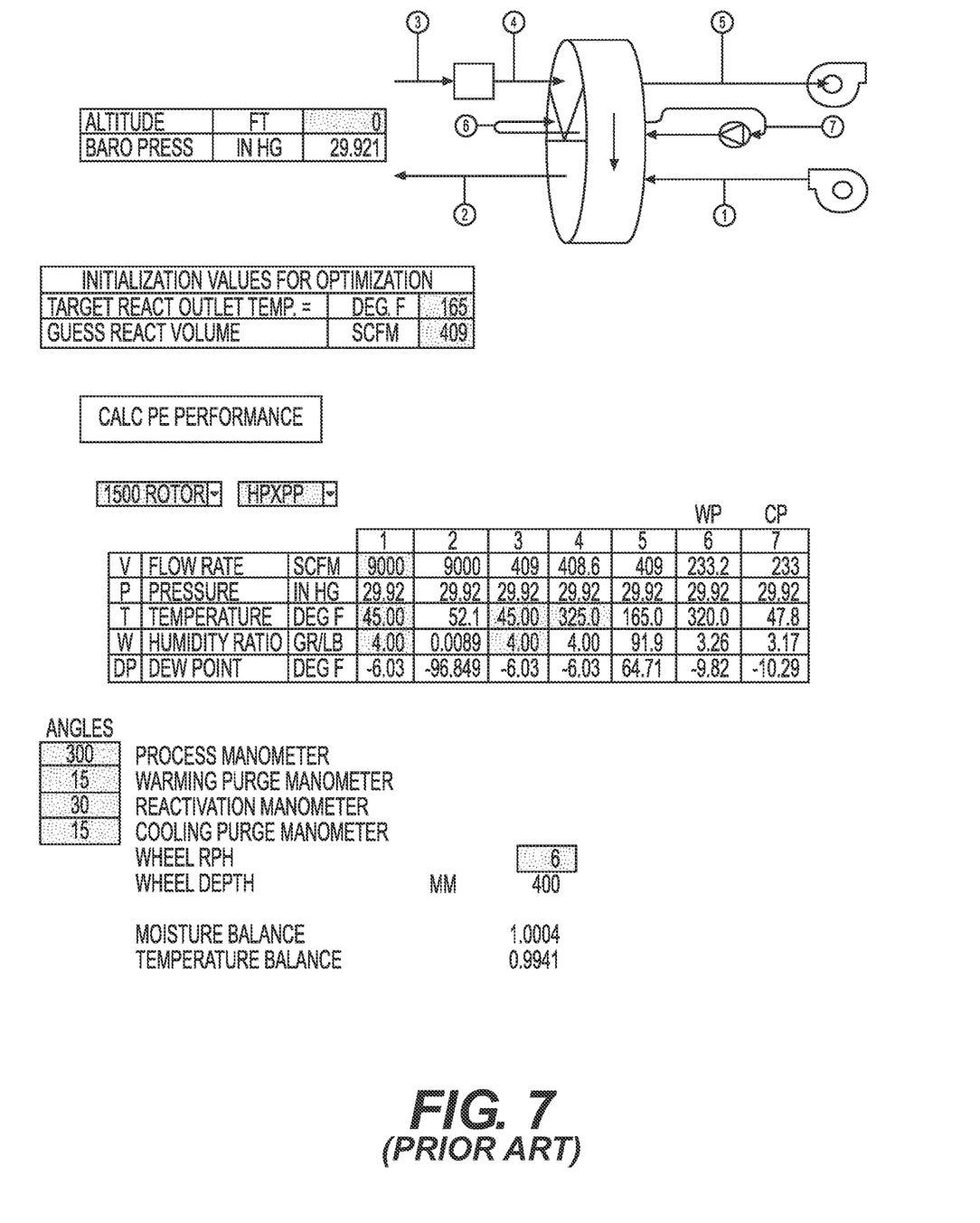
FIG. 7 shows operation data at various locations in the four-zone rotary bed sorption system at the first flow rate.
Figure 8:
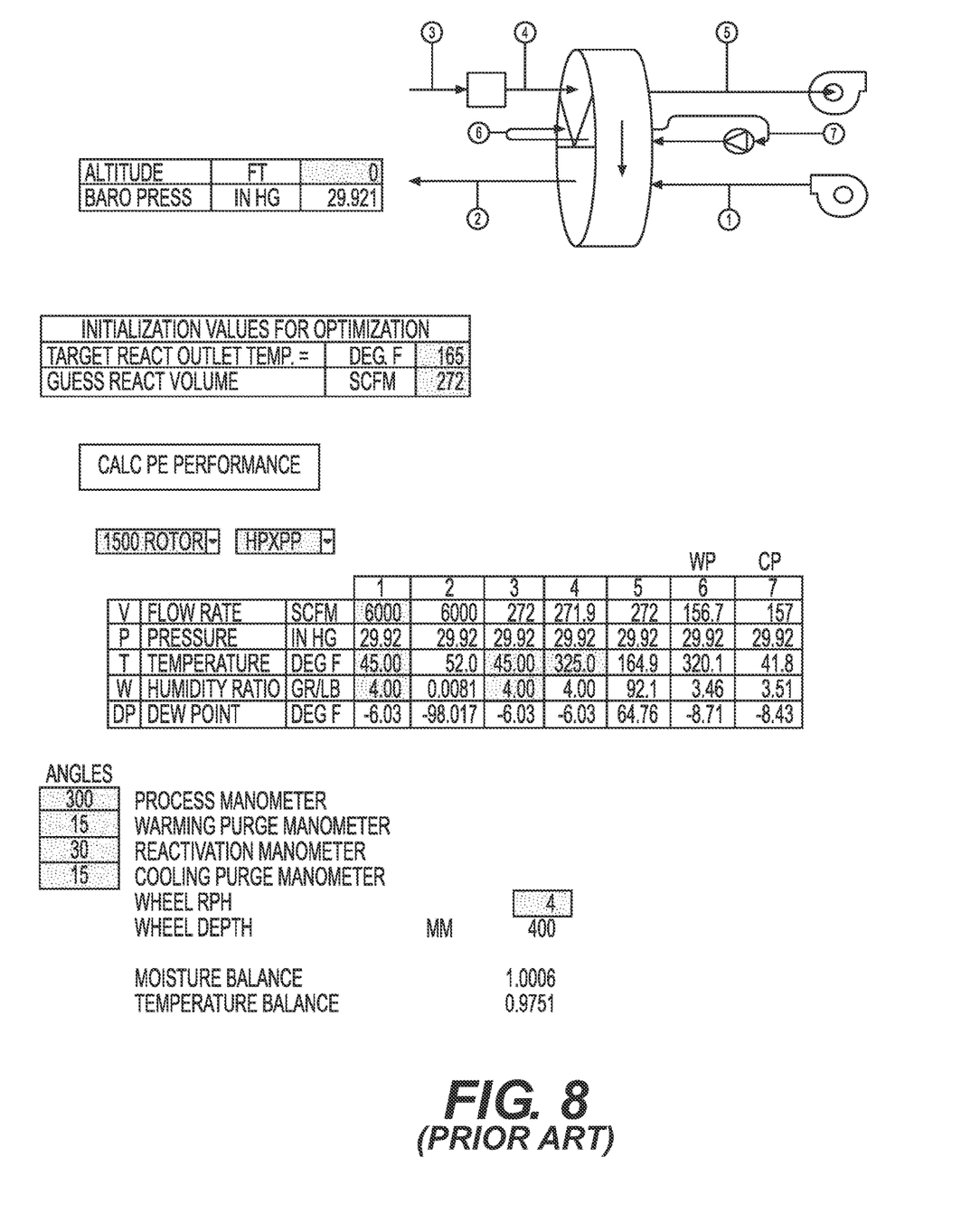
FIG. 8 shows operation data at various locations in the four-zone rotary bed sorption system at the second flow rate in FIG. 6.

The purge/regeneration loop uses heat from the purge regeneration zone of the rotor to preheat the air to be further heated for supply to the regeneration zone. The purge/regeneration loop air is dehumidified by the rotor 11, thereby creating a lower relative humidity for the supply to the regeneration zone. Regeneration of the rotor at a lower relative humidity creates the potential to achieve a lower dew point for the process leaving air. FIGS. 3 and 4 show conditions at various locations during operation of the system under the same ambient conditions, but at different flow rates for the process, regeneration, and isolation fluid streams. Comparing FIGS. 3 and 4 with FIGS. 7 and 8, the process leaving air dew point can be 8 to 20° F. (5 to 11° C.) lower than that in the conventional four-zone configuration shown in FIG. 6 operating at the same inlet conditions. The recycled isolation loop can cool the rotor material on the process air inlet side at the second isolation zone and use the acquired heat to pre-warm the rotor at the first isolation zone 2 before it enters the regeneration sector. Parameters at a process flow rate of 9000 SCFM are shown in FIG. 3 and parameters at a process flow rate of 6000 SCFM are shown in FIG. 4. The system of this embodiment can significantly decrease the energy needed for regeneration and increase the efficiency of the rotor.

In certain applications, further benefits can be achieved by providing additional recycled isolation loops. The present invention is not limited to two isolation loops, but can use three or more isolation loops depending on the characteristics of the various fluid streams and the desired level of treatment. Preferably, each additional isolation loop is arranged so that the isolation fluid stream passes through the sorbent mass in the same direction as the process or regeneration fluid stream that follows the isolation fluid stream in the direction of rotation of the sorbent mass. It is also preferred that each additional isolation loop be arranged so that, in a cycle of rotation, the sorbent mass sequentially passes through the isolation fluid streams in ascending and then descending order. In other words, for a nine-zone system with three isolation loops, for example, the sorbent mass would sequentially pass through a regeneration fluid stream, a first isolation fluid stream, a second isolation fluid stream, a third isolation fluid stream, a purge/regeneration fluid stream, a process fluid stream, the third isolation fluid stream, the second isolation fluid stream, the first isolation fluid stream, and so on. The number of isolation loops can be selected based on a determination of whether certain selected criteria relating to temperature, vapor pressure, absolute pressure, and/or leakage are satisfied. Whether the criteria are satisfied can be determined either by simulation or by physical testing. In the event it is determined that one or more of the selected criteria is satisfied, then this indicates that there may be a potential benefit in adding an isolation loop to the system. After the isolation loop is added, the determination is made again, and so on, until the selected criteria are not satisfied.

For example, two isolation fluid streams can be recycled in a closed loop, each independent of the process fluid stream 12, the regeneration fluid stream 14, and the other isolation fluid stream.

In the preferred embodiments described above, those of ordinary skill in the art will recognize that the selection of specific flow rates, pressures, temperatures, relative humidities, etc., depends on the particular application for the sorption system, and will be able to make appropriate selections for a given application.

Adding a single closed isolation loop to the system will reduce leakage of air by approximately one half. This is due to the closed loop nature of the isolation loop, which will cause it to equilibrate to an absolute pressure midway between the process and regeneration zones.

In certain applications the leakage between circuits must be minimized to the greatest extent possible. In concentration cycles, whether it be for VOC concentration or water concentration via closed-loop regeneration in low dew point environments (reference OPG Reactor), exfiltration from the process stream is as detrimental as infiltration, as the concentration ratio of vapor to the regeneration air stream must be maximized for cycle efficiency. In the case of the VOC concentrator, extra special care is taken to ensure even pressure balances between the process and regeneration circuits to maximize concentration ratios.

The embodiments discussed above are representative of preferred embodiments of the present invention and are provided for illustrative purposes only. They are not intended to limit the scope of the invention. Although specific configurations, structures, conditions, etc., have been shown and described, such are not limiting. Modifications and variations are contemplated within the scope of the present invention, which is intended to be limited only by the scope of the accompanying claims.

What is claimed is:

1. A method of reducing the sorbate concentration of a process fluid stream using a sorption bed system comprising a rotating mass of a regenerable sorbent material, the method comprising the steps of:
    rotating the sorbent mass so that, in a cycle of operation, a given volume of the sorbent mass sequentially passes through first, second, third, fourth, and fifth zones, before returning to the first zone;
    passing a process fluid stream through the sorbent mass in the first zone;
    passing a regeneration fluid stream through the sorbent mass in the third zone; and
    recycling an isolation fluid stream in a closed loop, independent of the process fluid stream and the regeneration fluid stream, between the sorbent mass in the fourth zone and in the second zone,
    wherein the regeneration fluid stream passes through the fifth zone before passing through the third zone.

2. The method of claim 1, wherein the direction of fluid flow in each of the first, fourth, and fifth zones is the same.

3. The method of claim 2, wherein the direction of fluid flow in each of the second and third zones is the same.

4. The method of claim 3, wherein the direction of fluid flow in each of the first, fourth, and fifth zones is opposite the direction of fluid flow in each of the second and third zones.

5. The method of claim 1, wherein a concentration of at least one member selected from the group consisting of water vapor, volatile organic compounds, and nitrous oxides is reduced as a result of passing the process fluid stream through the sorbent mass in the first zone.

6. The method of claim 1, further comprising the steps of:
    recirculating the regeneration fluid stream in a closed loop by first passing the regeneration fluid stream through the fifth zone; and
    heating the regeneration fluid stream after exiting the fifth zone and prior to passing the regeneration fluid stream through the third zone.

7. The method of claim 1, further comprising the step of recirculating the process fluid stream in a substantially closed loop to dehydrate or maintain dryness of a product.

8. A rotary sorption bed system, comprising:
    a rotating sorbent mass of a regenerable sorbent material, in a cycle of operation, a given volume of the sorbent mass sequentially passes through first, second, third, fourth, and fifth zones, before returning to the first zone;
    a process fluid stream directed through the first zone;
    a regeneration fluid stream directed through the third zone; and
    an isolation fluid stream that recirculates in a closed loop independent of the process fluid stream and the regeneration fluid stream through the second and fourth zones,
    wherein the regeneration fluid stream passes through the fifth zone before passing through the third zone.

9. The system of claim 8, wherein the process fluid stream and the regeneration fluid stream are passed through the sorbent mass in opposite directions, and the isolation fluid stream is passed through the sorbent mass in the same direction as a fluid stream immediately following the isolation fluid stream with respect to the direction of rotation of the sorbent mass.

10. The system of claim 8, further comprising a heating device disposed in the regeneration fluid stream between the fifth zone and the third zone so as to further heat the regeneration fluid stream before passing through the third zone.

11. The system of claim 8, wherein the process fluid stream is at a higher pressure than the regeneration fluid stream.

12. The system of claim 8, wherein the process fluid stream is at a lower pressure than the regeneration fluid stream.

13. The system of claim 8, wherein the process fluid stream is recirculated in a substantially closed loop to dehydrate or maintain dryness of a product.

* * * * *